INVENTOR.
HARRY V. MILES
BY Theodore M. Jablon
ATTORNEY.

Oct. 11, 1966 H. V. MILES 3,278,166
TREATMENT OF SUGAR JUICES CONTAINING A SUSPENSION OF SOLIDS
Original Filed Jan. 30, 1961 4 Sheets-Sheet 4

*INVENTOR.*
HARRY V. MILES
BY Theodore M. Jablon
ATTORNEY.

United States Patent Office 3,278,166
Patented Oct. 11, 1966

3,278,166
TREATMENT OF SUGAR JUICES CONTAINING A SUSPENSION OF SOLIDS
Harry V. Miles, Westport, Conn., assignor to Dorr-Oliver Incorporated, Stamford, Conn., a corporation of Delaware
Original application Jan. 30, 1961, Ser. No. 85,756, now Patent No. 3,166,443, dated Jan. 19, 1965. Divided and this application June 30, 1964, Ser. No. 388,745
10 Claims. (Cl. 259—8)

This is a division of application Ser. No. 85,756, filed January 30, 1961, now Patent No. 3,166,443.

This invention relates to the treatment of sugar bearing solutions containing impurities in suspension, and more particularly to a method and means for improving the filtration capability of such suspensions, for example cane mud delivered as sludge or underflow discharge in the clarification treatment of raw cane juice.

The invention is concerned more particularly with the problem of providing efficient continuous vacuum filtration of suspensions, for example cane mud, carrying quantities of very fine suspended particles of a kind which heretofore have defied all efforts to have them transformed into readily filterable floc structures or the like.

Such a suspension presents difficultities in carrying out continuous filtration, due in some cases to blinding of the filter media frequently interrupting the filter operation, and in other cases due to a large proportion of the particles escaping through the media impairing filtrate quality, so it must be re-treated before evaporation.

The invention, therefore, aims to overcome these obstacles to uninterrupted continuous filtration, and to provide clear filtrate along with other important operating advantages thereby to establish continuous as well as economical filtration.

Continuous vacuum drum filtration treatment of the cane mud as now practiced has superseded the earlier cumbersome intermittent filter presses which had been employed because of their ability to retain the fine particles present in large proportion in the mud. However, with continuous vacuum filter operation, because of its inability to retain the fines without blinding of the filter media, only a "dirty" filtrate of low clarity was heretofore obtainable unsuited for sending directly to the evaporators, so it must be recycled for retreatment through the clarifier, thus burdening the same and detracting from the efficiency of its performance.

It is among the objects of this invention to obtain in continuous operation a filtrate having a clarity comparable to that of the clarifier overflow, so as to enable the filtrate to be sent directly to the evaporators, accordingly relieving the burden on the clarifiers and improving their performance.

As a rule, in cane juice purification treatment, the clarification operation is conducted at an elevated temperature and with the addition of a carefully controlled amount of lime to react with certain juice impurities, whereby juice purifying precipitates are formed. The lime dosage in clarification is usually controlled within carefully determined limits of pH, such as to obtain adequate clarification compatible with the requirement that the presence of dissolved calcium in the clarified juice be held to a minimum in view of the hazard of scaling in the evaporator such as may occur due to precipitation of calcium saccharates.

This well-known cane mud clarification operation normally delivers an overflow of a clarity considered sufficient for this overflow to be sent to the evaporation stage, with the underflow from the clarifier still containing a substantial portion of the sucrose along with the separated mixed impurities. This underflow is subjected to continuous filtration for instance on the rotary vacuum drum filter, in order that the sucrose representing about 10%–20% of the total may thereby be recovered in the filtrate solution, requiring re-clarification before going to evaporation.

However, prior to this invention, attempts to obtain a clear filtrate in continuous filtration have been unsuccessful for the reason that the natural impurities as well as the aforementioned precipitates in the cane mud contain those large proportions of unavoidable fines and colloids which heretofore it had been impossible to form into sizable flocs by the use of flocculating chemicals, and which would quickly blind any of the conventional tightly woven or the like filter media, necessitating frequent replacement thereof and making impossible any reasonably uninterrupted filter operation. Such filter media being of low porosity are difficult to wash after cake discharge to prevent blinding, even though "bagacillio" which is a screened-out size portion of the fibrous cane bagasse, be used as the customary filter aid in the mud. Also, the conventional tight filter media or fabric offers high flow resistance of itself as well as high loss of sucrose in the filter cake caused by cake wash difficulty.

Because of the adverse conditions and the long standing problem above set forth, present practice employs continuous drum filters provided specially with a perforated element rather than a tight woven filter medium or its equivalent such as might be capable of detaining those fines as it does in the filter presses. For practical reasons, this thin perforated element or plate has openings or holes preferably not smaller than 0.020″ dia. providing about 20% through-flow area, to avoid interruptions due to blinding.

Such perforated plate or screen arrangement in the cane mud filters now widely used, represents a compromise in that it accepts a "dirty" filtrate due to the uncontrollable fines escaping through the perforated plate or screen, while gaining the advantage that at least a continuous filter cake delivery is achieved, and that an adequate cake sucrose wash recovery is also attainable commensurate with the degree of permeability and thickness of the cake. However, the thickness of the filter cake and its permeability for wash liquid are limited by the nature of the cane mud solids which together with the filter aid material constitute the filter cake.

Thus, it is among the more specific objects to obtain the desired clear filtrate by consolidating substantially all the fine particles in the cane mud into floc structures large enough to enable the use of an open type filter media backed by a supporting grid or screen. Such media should be of high porosity and low flow resistance, as well as readily washable free of any incidental fines to avoid the aforementioned frequent changes of the filter media due to blinding.

Other objects are to make possible greater cake thickness and filter capacity, as well as high cake sucrose recovery to be attained by greater permeability for wash liquid of both the filter cake and the filter media. Furthermore, the cake formed should be of a kind that is capable of being readily dislodged as by a doctor blade from the filter drum while leaving the filter media in a clean condition.

The foregoing objects pertaining to the removal of the fines from a solution, are attainable by the operation of a system of interacting substances in the suspension, wherein the flocculation of substantially all of the suspended fines is effected by the action upon these solids of certain coagulating agents in solution in the presence of certain auxiliary substances provided in a finely divided and suspended state. However, for purposes of this invention, the suspended auxiliary material itself should be capable of being transformed into sizable readily filterable flocs by the very same coagulating agent in solution.

In the case of cane mud, it was found that, among others, suspended lime particles supplied in a slurry, are highly effective as an auxiliary substance for the purposes of this invention, when applied in a required quantity and co-acting with a coagulating agent derived from a group of polyelectrolytes, preferably in the form of a partially hydrolyzed polyacrylamide. The flocculating agent of itself, however, it was found, need not have any such pronounced flocculating effect upon the fine solids in the mud if it were separately applied thereto. Such partially hydrolyzed polyacrylamides are of the anionic type and in the practice of this invention are found to be fully consumed in the flocculation operation by adsorption on the surfaces of the suspended particles.

Thus, the mud conditioning operation more preferably comprises (a) continuously mixing the mud while in transit through a mixing zone with a finely divided substantially inert auxiliary material so as to provide a suspension thereof among the mud solids, this auxiliary material having been selected for its ability of itself to form substantially all of its own particles into sizable floc structures in the presence of an applicable coagulant solution, and (b) passing this mixed cane mud through a flocculation zone while continuously introducing into the mixture the applicable coagulant solution in such a manner that the solution is substantially instantaneously dispersed throughout the mixed suspension, with the result that there is effected a substantially complete consolidation of all the fine particles into large composite floc structures. In this way, and employing the aforementioned "bagacillio" as a filter aid, there is attainable a filter cake of exceptional thickness as well as permeability, and otherwise of a structure and condition which enables it to be readily dislodged as a blanket from the filter media as by a doctor blade while leaving the filter media itself in a clean free washable condition, and delivering a filtrate of high clarity.

A criterion of the suitability of the auxiliary material for the purposes of this invention lies in its own capability to convert substantially all its particles into sizable floc structures in the presence of the applicable flocculent solution, even though this flocculating agent itself may not have any pronounced flocculating effect upon the fine solids in the mud when separately applied thereto as a solution.

Thus conditioned and with the fines and colloids substantially all consolidated into sizable floc structures the mud is fed to a continuous vacuum filter provided with an open type filter medium, preferably an open felt type cloth. The preferred felt type cloth may be defined as a spongy system of intertwined fibers preferably synthetic, constituting a mesh work, that is relatively open and of high porosity and low resistance as compared with the aforementioned conventional tight woven filter cloth, yet of a structure that is readily spray-washable after cake discharge so it will be kept free of any incidental fines. Filter aid material such as "bagacillio" may be introduced at any desired point of the mud conditioning operation, preferably into the aforementioned mixing zone.

The invention is directed to novel and highly practical apparatus for effecting the dispersion of the treatment solution into a stream of liquid, suited for carrying out the aforementioned cane mud pre-treatment operation where the coagulant solution is to be dispersed into the mud.

Other features and advantages will hereinafter appear.

The novel features which are considered as characteristic of the invention are set forth in particular in the appended claims. The invention itself, however, both as to its construction and its method of operation, together with additional objects and advantages thereof will be best understood from the following description of specific embodiment when read in connection with the accompanying drawings, in which:

Figure 1:
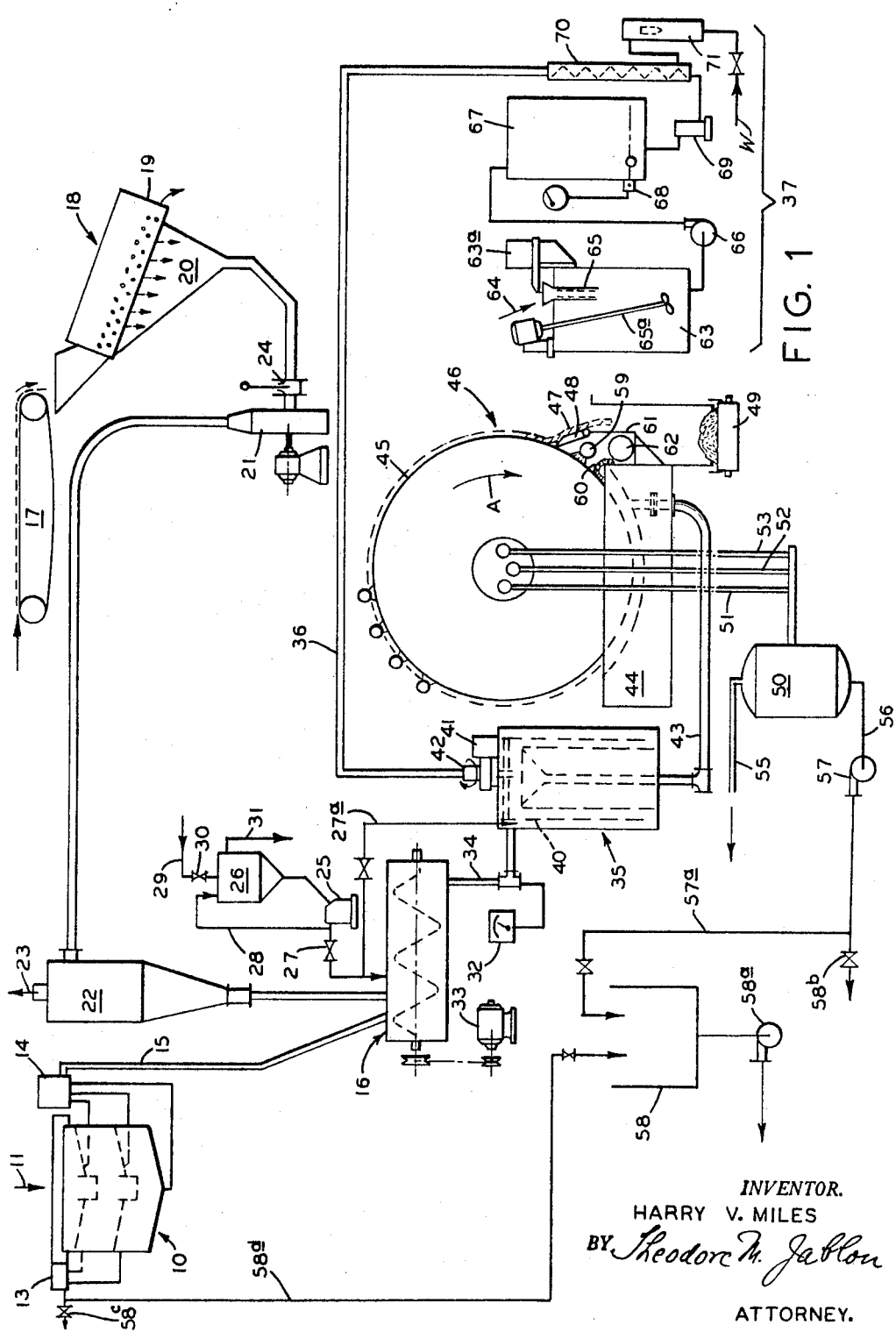
FIG. 1 shows diagrammatically an example of a treatment system illustrating the manner of producing cane mud filtrate of high clarity according to this invention, including a special vertical flocculating unit for supplying treated cane mud to a rotary vacuum filter unit.

As exemplified in FIG. 1 of the drawings, the treatment process of this invention is continuous from the point of cane mud supply at the one end to the delivery of clear can mud filtrate and of an improved filter cake at the opposite end of the system.

The cane mud to be treated in accordance with this invention to condition it for continuous filtration may be derived as underflow from a conventional multiple tray clarifier 10 which has the raw juice supplied thereto indicated at 11, with overflow of clarified juice at 13, and underflow withdrawal from the respective tray compartments of the clarifier indicated at 14 having a delivery conduit 15 for supplying the cane mud to a mixing station 16.

In this example, the cane mud as it comes from the clarifier is mixed in the mixing station 16 with a filter aid material, the conventional "bagacillio" derived from bagasse which is the fibrous cane residue obtained from the cane crushing operation. The source of the "bagacillio" filter aid supply is indicated by a conveyor 17 delivering bagasse into a rotary screen unit 18 which rejects a coarse fraction as at 19, while passing through the screen openings the balance of the material into a receiving hopper 20 whence a blower unit 21 forces it into a cyclone separator 22 which eliminates a dust fraction or the like at 23, while delivering an intermediate particle fraction, the "bagacillio" into the cane mud mixing station. The rate at which this filter aid material is supplied to the cane mud in the mixing station is controllable as indicated by the gate 24 provided at the intake side of the blower, and if desired it may also be controlled by a feed splitting device or the like (not shown) which may be located at the bottom or vortex end of the cyclone separator.

Furthermore, in this example, a slurry of finely divided auxiliary substance, in this instance a lime slurry, is also introduced into the cane mud as it passes through the mixing station, in addition to the filter aid. The rate of dosage of this auxiliary substance is controlled as by a metering pump 25 supplied with lime slurry from a constant level tank 26, and delivering the metered slurry through control valve 27 into the mixing station, with a by-pass connection 28 effective to return excess slurry from the metering pump to the tank. Lime slurry supplied to the tank is indicated by a supply connection 29 provided with control valve 30. The tank itself has an overflow connection 31. A valved branch supply connection 27a is shown indicating that part or all of the slurry of auxiliary substance may be delivered into the flocculation treatment unit 35 described below.

A pH meter 32 is connected to the discharge end of the mixing station indicating the pH of the mixed mud as it leaves the mixing station. While the lime solubility in the mixture is very low, these pH indications will nevertheless provide an indication of the amount of suspended lime particles present in the mixture at the treatment stage and available for subsequent reaction with the coagulant solution. The quantity of suspended lime in the mixture governs the clarity of the filtrate, since the size and efficiency of floc formation is dependent upon the amount of this auxiliary suspension. The mixing station 16 itself may be a unit of the horizontal blunger type, with the horizontal mixer shaft driven by a motor 33.

Mixed cane mud leaves the mixing station 16 containing the filter aid material and the suspended lime, and passing through transfer pipe 34 reaches a vertically arranged flocculating treatment unit 35 which in turn receives coagulant solution through supply pipe 36 from a coagulant make-up station 37 providing the solution continually at a desired strength. This flocculating unit 35 embodies a concept of construction and of operation whereby there is attainable substantially instantaneous dispersal of the coagulant solution into the mud, in order that the desired flocculation of all of the mixed solids including substantially all the fines may be attained in this operation. Other embodiments will be described below.

This flocculating unit features a rotary structure 40 for effectively dispersing the coagulant solution into the mud in transit through the flocculating unit, with drive mechanism 41 indicated for rotating the diffusor structure, and with a rotary coupling 42 connecting the stationary coagulant supply pipe 36 with the rotary diffusor structure. A more detailed construction of this flocculating unit is shown in FIGS. 2 to 5 further to be described.

The mud thus prepared or preconditioned in the flocculating unit and now containing filterable flocs instead of fines, continuously passes through transfer pipe 43 into the tank 44 wherein operates the filter drum 45 of a rotary vacuum filter unit 46 the general construction and operation of which is known.

The filter drum rotating in the direction of arrow A, continuously delivers a filter cake 47 over a doctor blade 48 onto a conveyor 49, while cane mud filtrate is withdrawn axially from the interior of the drum into a vacuum receiver 50 through filtrate pipes 51, 52, and 53 indicating the separate withdrawl of different filtrates from respective phases of the filter operating cycle. The primary or strong filtrate constituting the filtered juice may pass through pipe 51, while the more dilute filtrates, resulting from a first and second spray wash application to the filter cake as indicated by the spray wash arrangement 54, may pass respectively through lines 52 and 53. The vacuum receiver itself has a continuous vacuum connection 55 as well as a continuous filtrate discharge connection 56 with pump 57 for delivering the filtrate from the receiver to a point of use. Since the filtrate is of a high grade clarity as a result of the operation of this invention, namely of a clarity in the order of that of the overflow from the clarifier, it may therefore be pumped as through valved line 57a to a holding tank 58 which may also receive the clarifier overflow. A pump 58a may transfer the mixed filtrates from this holding tank to an evaporation station. A valved bleeder connection 58b is shown to branch off from line 57a. Another valved bleeder connection 58c leads from a valved line 58d, the latter delivering overflow juice from the clarifier to the holding tank 58.

The continuous filter unit 46 has a second spray wash device 59 provided thereon between the point of cake discharge and the point of re-immersion of the filter medium into the pulp bath in the filter tank, a rubber lip 60 being mounted upon and along the associated edge of the tank for resiliently engaging the washed filter media so as to divert spent spray wash water into a trough 61 having a discharge opening 62. Under the operating conditions called for by this invention involving the special pre-conditioning of the mud along with the use of special filter media, the wash device 59 will maintain the filter media by the impact of the sprays thereon continuously free from particles or fines, since the kind of filter media employed is readily washable under the favorable filtration conditions maintainable by this invention, with most of the spent wash water rebounding into trough 61.

In this way, the rotary drum filter such as the one herein exemplified, will deliver a clear filtrate as well as improved filter cake continuously, inasmuch as blinding of the filter media is continuously avoided. Moreover, where rotary drum filters are in existence and in operation, they can be readily and economically converted for practicing this invention by substituting the required filter media arrangement and pre-conditioning the mud in the manner herein set forth, illustrated, and described.

The coagulant make-up station 37 such as exemplified in FIG. 1, comprises a make-up tank 63 wherein a powdered coagulant material metered out continuously by an adjustable vibrator feeder 63a, is dissolved to a preliminary strength, with both the powder and solution water 64 being fed into a wetting device 65 delivering the mixture into this make-up tank 63 where a propeller mixer 65a keeps them agitated, mixed, and dissolved to the preliminary strength. A pump 66 will transfer the solution to a holding tank 67 which may be provided with an electric level indicating probe device 68 operating to prevent the solution level from falling below a predetermined minimum, in order that a continuous supply of the coagulant solution to the flocculating unit may thus be assured.

A metering pump 69, for example of the plunger type pump having adjustable stroke devices, draws the solution from the holding tank at a required dosing rate for delivery into a dilution mixing device or dilution mixer 70 which simultaneously receives a measured supply of diluting water W through a liquid flow meter 71 which may be of the Rota-meter type. By a suitable setting of the flow meter the solution may thus be diluted, so that a final coagulant solution of a suitable concentration may reach the flocculating unit 35 through the supply pipe 36.

The flocculating treatment unit 35 embodies a concept according to which the liquid or cane mud passes therethrough in a shallow stream while the coagulant solution is injected from a multitude of orifices or issue points submerged in that stream, which orifices are kept moving in a direction other than the direction of the stream, and preferably in a direction transversely of the direction of that stream.

Accordingly, the vertical flocculating unit 40 of FIG. 1, according to FIGURES 2 to 5, comprises an annular tank structure 72 consisting of an outer cylindrical shell 73 and an inner cylindrical shell 74 both concentrically arranged and interconnected by an annular bottom 75, with the top end of the inner shell terminating a distance D–1 below the top end of the outer shell. These concentric shells define between them an annular tank space 76 wherein the coagulating treatment of the cane mud is effected. The outer shell has at its upper end a tangentially arranged influent connection 77 receiving the mixed cane mud from the mixing station through the aforementioned transfer pipe 34.

Treated cane mud mixture overflows from the inner shell into a centrally disposed discharge pipe 78 having a funnel-shaped connection 79 with the top edge of the inner shell, and also having a lower flange connection 80 with the aforementioned transfer pipe 43 leading to the drum filter 45.

In the annular tank space 76 there operates a cylindrical coagulant diffusor structure 81 substantially concentric with the tank and rotatably supported from the top. More particularly, this diffusor structure comprises a carrier cylinder 82 spaced substantially evenly from both shells and extending into the aforementioned annular space 76 a distance marked D–2 below the top edge of the inner shell and terminating a suitable distance D–3 from the annular bottom of the tank, while extending a distance D-4 upwardly from the top edge of the inner shell.

The top end of the carrier cylinder 82 is rigidly connected or welded to an annular supply header 83 of substantially square cross section for receiving and distributing the treatment or coagulant solution to vertical pipes mounted on the carrier cylinder and communicating with the header and extending downwardly therefrom, for introducing the solution into the liquid or cane mud to be treated in the flocculating unit 35. Thus, an outer set of vertical pipes or diffusor tubes 84 (see detail FIG. 3) are mounted upon the outer face of the carrier cylinder and evenly spaced from one another along the periphery thereof. An inner set of vertical pipes or diffusor tubes 85 is mounted upon the inner face of the carrier cylinder, which tubes may be similarly spaced from one another although preferably staggered with respect to the outer tubes 84.

Each of the vertical diffusor tubes may rest upon a respective clip member or bracket 85a fixed to the bottom edge of the carrier cylinder, with the upper ends of these tubes extending into the header 83, namely through the bottom wall thereof and in slideably sealing relationship therewith the details of which will be described.

The rotary structure 40 further comprises a transverse beam construction 86 fixed to the header 83, and also having fixedly connected or welded thereto a central vertical tube member 86a providing drive connection with a motorized drive unit 87 (corresponding to the one designated 41 in FIG. 1) mounted overhead upon transverse supporting means or members 88 which are endwise supported upon and fastened to the top end of the outer shell. The vertical tube member 86a of the rotary structure 40 has a key connection 89 with a driving sleeve 90 which is rotatable although axially non-shiftable in the housing 91 of the drive mechanism, which driving sleeve is rotated together with the rotary structure by the mechanism. This central tube member 86a (see detail FIG. 4) is secured against downward axial displacement by means of a snap lock ring 92 cooperating with a thrust ring 93 which in turn rests upon the top face of the drive sleeve member 90.

The supply header 83 in turn has a supply pipe connection through which the coagulant solution may be supplied under pressure comprising a horizontal tube 94 extending radially from the inner sidewall of the header to the center of the rotary structure, and a vertical tube 95 extending from the inner end of tube 94 up through the central tube member 86a and sufficiently beyond the upper end thereof to connect with the stationary solution supply pipe 36 by means of the aforementioned rotary coupling 42 indicated in FIG. 1.

Figure 5:
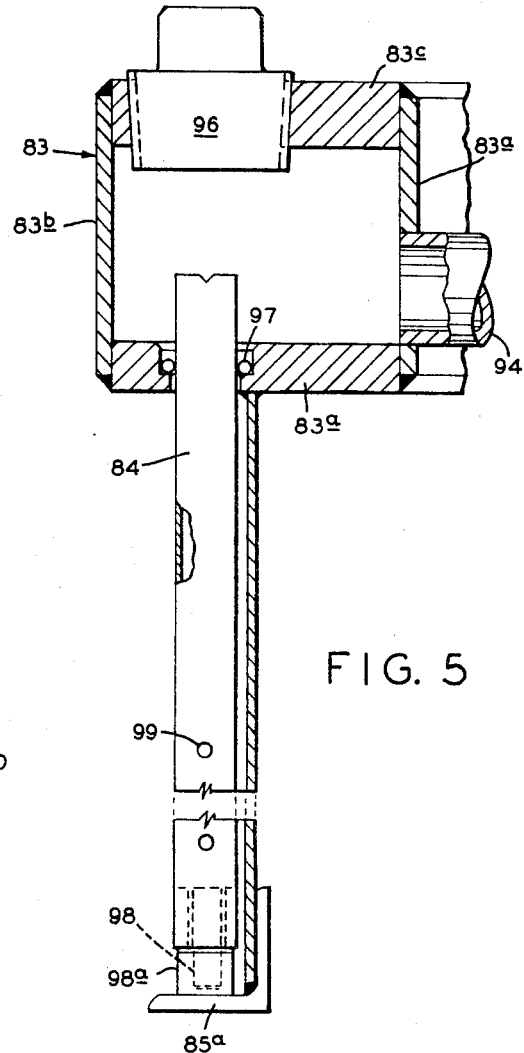
FIG. 5 is another similarly enlarged detail view of the flocculator unit, taken from FIG. 2 and showing the mounting of the vertical diffusor tubes, featuring exchangeability thereof.

Referring to the detail of FIG. 5, it will be seen that the annular solution supply header 83 has inner and outer cylindrical walls 83a and 83b interconnected by annular top and bottom walls 83c and 83d respectively. Screw plugs 96 close openings in the top wall 83c of the header, opposite the top ends of respective pipes 84 and 85 so that upon removal of these plugs the pipes may be withdrawn upwardly through the holes, to be inspected or replaced, the penetration of the pipes through the bottom of the header being sealed by suitable means as illustrated by the application of a rubber O-ring 97. The lower end of the pipes is plugged by a pin 98 held in a socket 98a fixed to supporting clip member 85a.

Each of the pipes has a plurality of submerged discharge orifices 99 spaced along the length thereof, constituting a multitude of issue points for the coagulant solution to be dispersed into the mixed cane mud flowing first downwardly through space S-1 between the carrier cylinder and the outer shell, and then inwardly around the bottom edge of the carrier cylinder and again upwardly through space S-2 between the carrier cylinder and the inner shell of the tank, finally overflowing at S-3 into the central discharge pipe 78 of the tank. Preferably, the discharge orifices 99 are arranged laterally all facing in the same direction as indicated by the jet arrows "R" (see FIG. 3), thus in a direction opposite to that of the rotation of the diffusor structure indicated by the arrow "Q."

Figure 2:
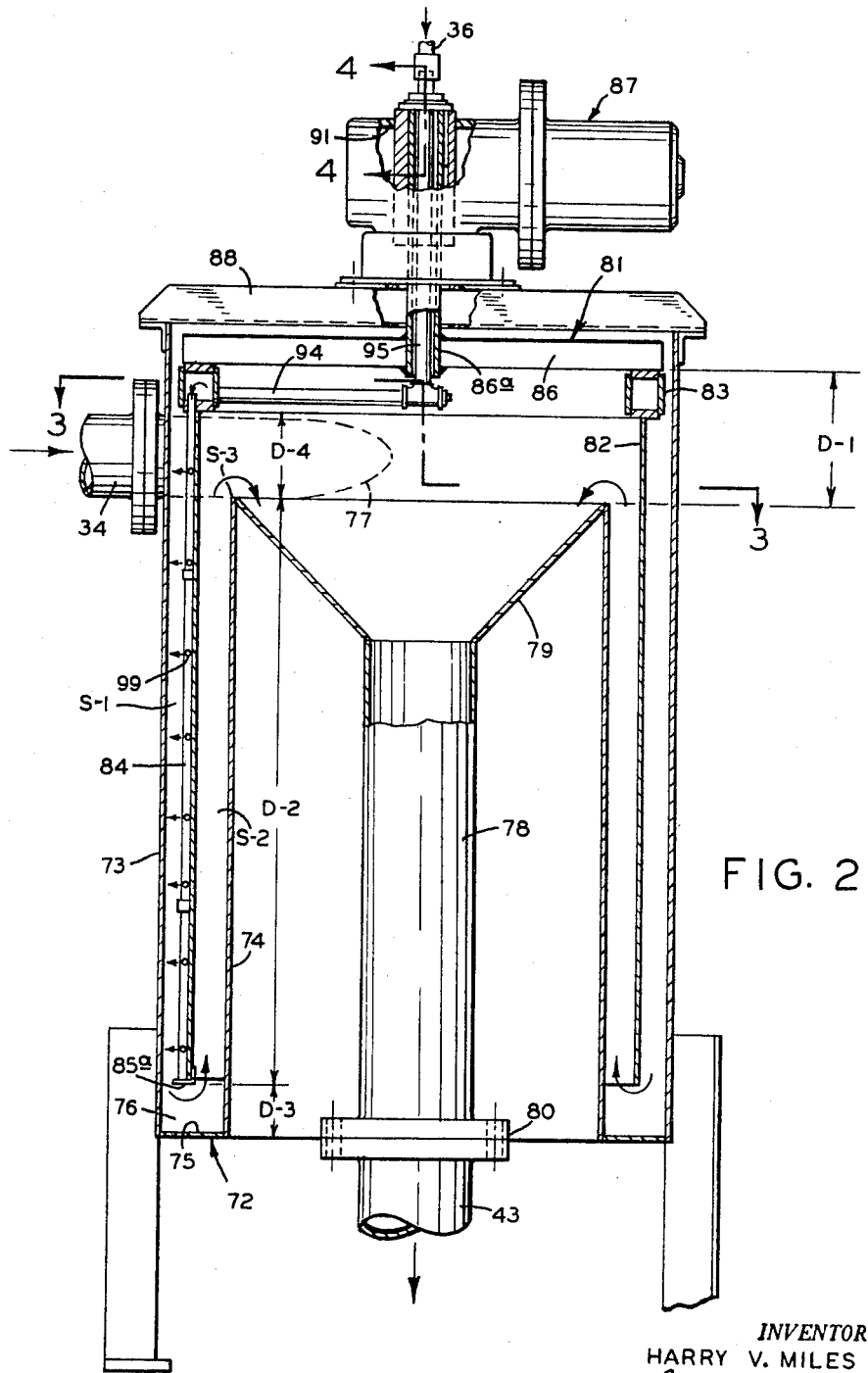
FIG. 2 is an enlarged vertical sectional view of the flocculating unit, featuring a plurality of vertical coagulant diffuser tubes supplied with coagulant solution from an annular rotating header constituting a unit with the tubes.
Figure 3:
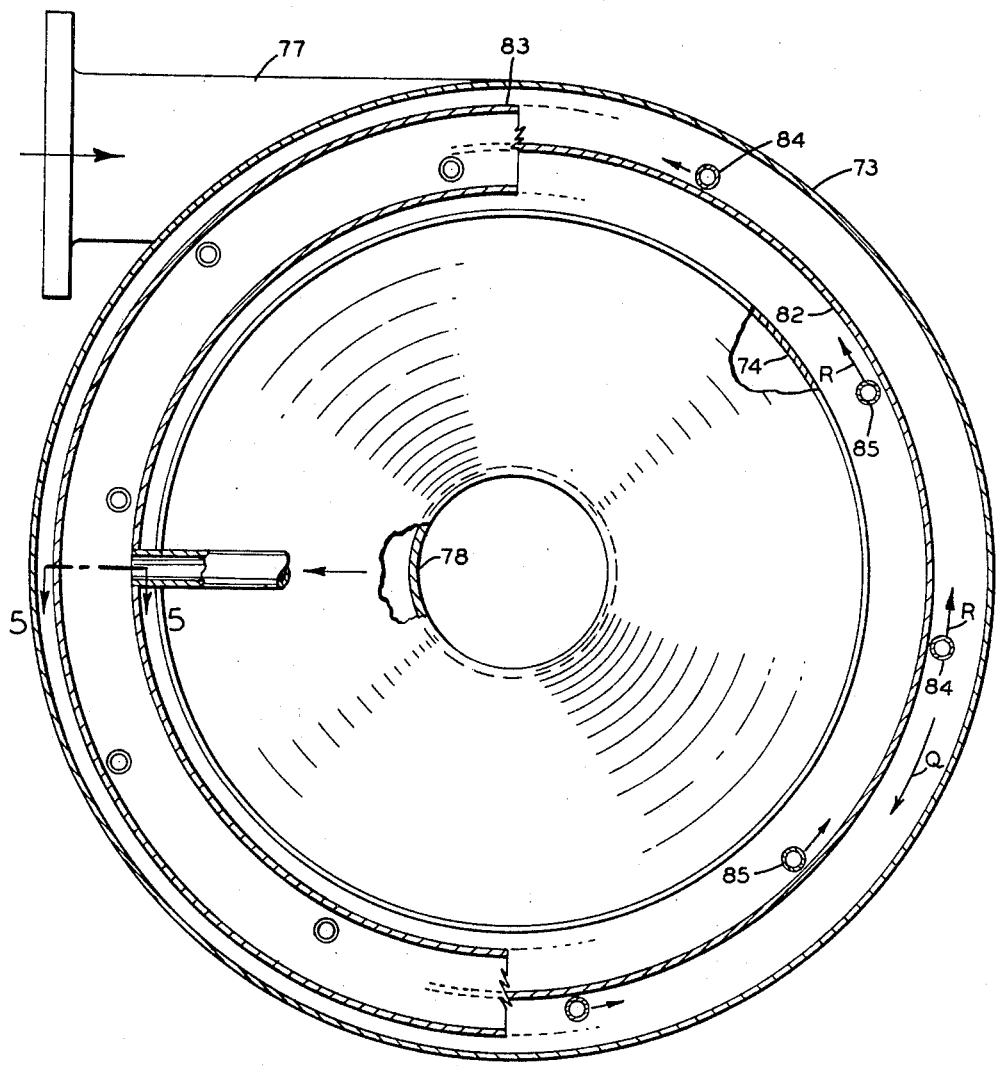
FIG. 3 is a cross-sectional view of the flocculating unit taken on line 3—3 in FIG. 2.
Figure 4:
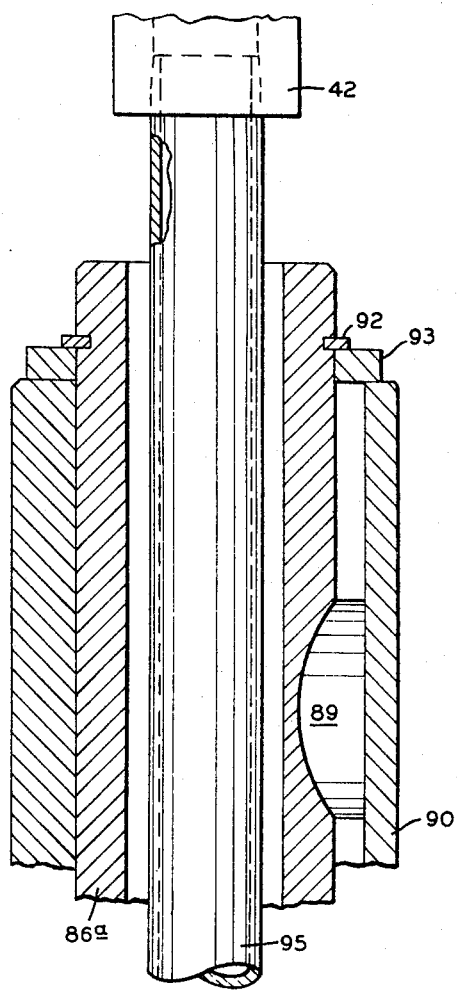
FIG. 4 is a greatly enlarged detail view of the flocculator unit taken on line 4—4 in FIG. 2, illustrating details of a drive arrangement for the flocculator unit, with a coagulant supply conduit extending centrally therethrough.

The embodiment shown in FIG. 2 of the vertical flocculating unit is highly effective in providing the required instantaneous dispersal of the coagulant solution due to a combination of factors, namely (a) the provision of a multitude of injection orifices 99 to which the coagulant solution is supplied preferably under a pressure sufficient to cause jets of the solution to be emitted from these orifices, and (b) moving the orifices in a direction transversely of the general flow direction of the stream of cane mud passing through this flocculating apparatus, with the swirls in the wake of the diffusor tubes effectively supporting the dispersion.

More particularly, since the jets of coagulant solution issuing from the orifices are directed counterclockwise for example, while the structure 40 is rotated in clockwise direction, the swirls that will develop in the wake of the moving pipes 84 and 85 will at once engulf the jets issuing therefrom, thus favoring instantaneous dispersal.

*Operation*

The invention may be practiced, for example, by treating a sugar juice containing a suspension of impurities, for instance cane mud, in the treatment system exemplified in FIG. 1 of the drawings, featuring the specially constructed flocculation unit 35 details of which are further illustrated in FIGS. 2 to 5.

This flocculation unit receives a prepared cane mud mixture from the mixing station 16 which in turn is supplied with the cane mud proper constituting the underflow from clarifier 10, and also supplied with "bagacillio" filter aid material from the cyclone sifter 22, and further supplied with a slurry of finely divided substantially insoluble auxiliary material, for example lime, dispensed by the metering pump 25 drawing from the constant level slurry supply tank 26. This flocculating unit in addition to receiving this prepared cane mud mixture also receives coagulant solution of a suitable quantity and strength, from the coagulant supply—or makeup station 37. The flocculating unit operates to deliver to the vacuum drum filter unit 46 a flocculated cane mud mixture having substantially all its particles and especially the large proportion of fines converted into large floc sizes as a result of operating conditions, which include the instantaneous dispersal of the coagulant solution into the flocculating zone in the presence of the auxiliary material also dispersed in the mud. For suitable effect in the operation of the invention, particle sizes of this auxiliary material are preferably within a range of 0.1–75.0 microns more or less.

The coagulant employed in this embodiment of the invention is a water soluble, high molecular weight, anionic type polyelectrolyte as exemplified by the Dow Chemical Co.'s product designated as Separan AP-30.

The drum filter in turn features a special felt type filter cloth the general structure of which is a nonwoven system of intertwined fibers preferably synthetic, constituting a mesh work of high porosity and low flow resistance. Such a filter media, under the operating conditions of this invention, has been found to be readily washable by the spray wash device 59 directly after cake discharge. This wash was found to be effective to flush outwardly, namely towards the cake discharge side of the filter media and into the trough 61, any incidental residual fines that may have remained on this filter media, since the major portion of the spray wash water rebounds from the media carrying back with it the detached fines, with only a small portion of the wash water penetrating the media to be drawn off along with the other filtrate fractions into the vacuum receiver 50 for the drum. In this way, it was found that filter operation could be carried on in a continuous fashion, since blinding due to any accumulation of fine particles in the media was avoided, while delivering a filtrate solution of high clarity adapted for evaporation, as well as an improved filter cake.

In a preferred embodiment, the aforementioned felt type filter media is backed by a perforated plate. The prior cane mud drum filters can be readily converted for practicing the invention by applying to the existing perforated plate thereof the above indicated filter.

As a result of the pre-conditioning of the mud in the manner described by this invention with the resulting consolidation of the fines, a filter cake of much greater permeability and much greater thickness could be produced continuously in the improved operation, as compared with the cake thickness producible on the conventional cane mud drum filter using the aforementioned perforated plate. Whereas thinner cake was produced conventionally on the perforated plate of the prior cane mud filter with the resultant "dirty" filter requiring additional solids separating treatment in the clarifiers, much thicker cake was obtained by practicing the invention in continuous operation, leaving a clean filter media and delivering a filtrate of high clarity ready for evaporation substantially the same as the clarified juice overflowing from the clarifier 10, and thus ready for evaporation.

In the continuous production of an improved filter cake by this invention on a continuous vacuum drum filter, such a cake in continuous blanket form is readily dislodged by the doctor blade from the filter media backed by the aforementioned perforated plate, while the media itself is left in a clean and free washable condition. Moreover, it was found that a greatly improved cake wash efficiency could be achieved over that heretofore attainable on the aforementioned prior cane mud drum filters, due to the advantageous effects of the high porosity filter cloth combined with the advantage of the highly permeable even though much thicker filter cake producible by this invention, all as will be furthermore set forth below.

A preferred mode of the cane mud treatment operation of this invention will now be described more specifically by reverting to the treatment system of FIG. 1, involving the aforementioned flocculation treatment of the mud followed by the improved continuous filtration.

Hot raw cane juice 11 is continuously supplied to the clarifier 10, dosed with a carefully controlled amount of lime reacting with the juice impurities to encourage gravitational solids separation. The overflowing clarified juice having a solids content usually in a range of 0.05 to 0.25% by volume with particle sizes substantially in the 1–10 micron range, may be supplied to the evaporation stage and subsequent crystallization. The underflow sludge or cane mud is continuously delivered from the clarifier with a solids content of about 5% to about 20% by weight, containing a suspension of the lime reaction precipitates as well as of the natural juice impurities with a considerable proportion of extremely fine particles of either group including those of colloidal or near colloidal size which heretofore have defied all efforts to have them transformed into readily filterable flocs. This cane mud is supplied continuously to the mixing station 16.

The "bagacillo" filter aid material added to the cane mud in the mixing station 16 represents an intermediate size fraction of the cane bagasse or fibrous cane residue that comes from the cane crushing mills at a moisture content of about 50%. This fraction of the fibrous material is derived from the operation of screen 18 where it passes through the perforated plate screen element thereof preferably having screen openings in the order from about $3/16$ inch to $1/4$ inch diameter, and from which the cyclone separator 22 will remove the dust portion or very small particles or the like before admission of this material into the mixing station 16 as a filter aid.

The required amount of "bagacillo" added will vary somewhat in proportion to the quantity of solids contained in the mud. However, the quantity added is preferably in a range of 30% to 50% of the mud solids, both on a dry basis, adjusted from the point of view that the cake adhesiveness resulting from the operation of this invention should be such that the cake will not be too hard to discharge from the surface of the filter drum, nor too permeable to interfere with cake formation at the rising side of the filter drum. Control of the amount of this filter aid material is indicated by gate 24 admitting the fibrous screen product to the blower 21. Lime slurry constituting the auxiliary material is introduced part or all into the mud either before or after the addition of the filter aid, followed by the controlled introduction of the coagulant solution into the flocculation station 35 which may also receive the balance of the amount of lime slurry required in this preconditioning treatment of the mud.

The thus prepared mud is then subjected to treatment in the flocculation unit 35 the operation of which is clear from the detail showing thereof in FIGS. 2 to 5 and from the foregoing description, featuring the instantaneous dispersal into the prepared mud of the coagulant solution continuously received by the unit from the supply station 37 in suitable dosage and suitable dilution. When partially hydrolyzed polyacrilamide is employed as the coagulating agent, an effective dosage range thereof, in the practice of this invention, is from about 10 p.p.m. to about 60 p.p.m. taken on the rate of cane mud fed to the filter. The dosage may vary substantially proportional to the total solids concentration in the prepared mud as supplied to the flocculation unit, whereas a suitable and effective concentration of this coagulant solution is preferably about 0.05% by weight.

As a result of the foregoing preconditioning treatment of the mud prior to filtration, substantially all of the suspended solids then in the mud and particularly the very fine particles and colloids, are consolidated into floc structures of substantial size measuring from about $1/64$ to about $1/8$ inch. Having attained that size the solids are readily filterable on the vacuum drum filter 46 producing the improved cake quality and quantity along with the aforementioned cake wash and media wash advantages, where the vacuum drum filter 46 is equipped with the aforementioned preferred Dacron felt type filter cloth supported by the aforementioned and above defined conventional perforated plate on the filter drum.

From the foregoing, it will be seen that the invention when carried out, for example, in the cane mud treatment system illustrated in FIG. 1, will yield in continuous operation and economically, a clear filtrate which may be sent directly to evaporation, as well as a filter cake of greatly improved quality and quantity as a result of the increased filter capacity due to the invention. Yet, for all practical purposes, the blinding of the special filter media herein employed is prevented so that interruptions in the operation and frequent renewals of the filter media are economically avoided.

Furthermore, such improved results of the filtration operation are attainable in practicing the invention, by the novel preconditioning treatment of the mud, effective to consolidate the objectionable fines substantially completely into large size flocs, with coagulent solution applied in a manner inducing substantially instantaneous dispersal in the presence of the auxiliary suspension which of itself is coagulatable by that same solution, but with no significant affinity required directly between that coagulant solution and the original solids in the mud.

Furthermore, it will be noted that the novel preconditioning and flocculating treatment alone of sugar bearing solutions, for example cane mud as obtained from juice clarification, provides a mode of operation whereby a heretofore unattainable degree of flocculation can be reached, inasmuch as substantially all the fine particles in the mud are converted into large size floc structures readily separable from the mud, thereby improving the operation of any separating apparatus that may receive the preconditioned mud.

Significant overall economies over prior art are therefore attainable by practicing the invention either in part or all, both as to operating and installation costs. Greater juice purity is attainable from the clarifiers due to relatively reduced detention time in the absence of filtrate recirculation.

Among others, it is one of the advantages that an underflow of relatively lower concentration may be discharged from the clarifier, providing an overflow of possibly even greater than the usual clarity, while permitting the subsequent treatment of this invention to separate the additional amount of sugar bearing solution, as by the high capacity filtration or the like.

While the invention has been illustrated and described with respect to the treatment of sugar bearing solution, preferably cane mud as obtained from a clarification operation, it is not intended to be limited to the details shown, since various modifications and structural as well as operational changes may be made without departing from the spirit of the invention.

I claim:

1. Apparatus for effecting dispersion of a treatment solution into a liquid, which comprises an outer cylindrical shell, an inner cylindrical shell concentric therewith and forming with said outer shell a treatment chamber, a plurality of pipes extending in said treatment chamber substantially longitudinally thereof and spaced from one another about the axis of said treatment chamber, said pipes being constructed and arranged for introducing the treatment solution therethrough into the liquid passing through said chamber, support structure interconnecting said pipes for maintaining them in said spaced relationship as a unit, mounting means for rotating said support structure whereby said pipes are movable in a circular path in said treatment chamber about said axis, feed means for supplying treatment solution to said pipes while said support structure is rotating, and means for causing the liquid to be treated to pass lengthwise of said chamber.

2. The apparatus according to claim 1, wherein said shells are vertically disposed, and wherein overflow means are provided associated with the upper end of one of said shells for discharging the treated liquid.

3. Apparatus for effecting dispersion of a treatment solution into a liquid, which comprises an outer cylindrical shell, an inner cylindrical shell concentric therewith and forming with said outer shell a treatment chamber, an annular bottom interconnecting mutually adjacent ends of said cylindrical shells, a carrier cylinder located in said treatment chamber concentric therewith spaced from said bottom to provide an annular bottom transfer passage for the flow path of said liquid passing down at the outside and up at the inside of said carrier cylinder, conduit means located within and connected to said inner cylindrical shell for discharging liquid from the end of said flow path of the liquid through said treatment chamber, a plurality of pipes liquid provided on said carrier cylinder, said pipes being constructed and arranged for introducing treatment solution therethrough into the liquid passing through said chamber, support means for said carrier cylinder enabling the same to be rotated, feed means for supplying treatment solution to said pipes while said carrier cylinder rotates, and inlet means for supplying said liquid into the space between said outer cylindrical shell and said carrier cylinder.

4. The apparatus according to claim 3, wherein said pipes are laterally spaced from one another and substantially co-extensive with the axis of the carrier cylinder, and provided with discharge orifices spaced along the length thereof.

5. The apparatus according to claim 3, wherein said diffuser means comprises one set of pipes located at the outer face of said carrier cylinder and spaced laterally from one another, and another set of pipes located at the inner face of said carrier cylinder and spaced laterally from one another, both sets of pipes being substantially coextensive with the axis of the carrier cylinder.

6. The apparatus according to claim 3, wherein said diffusor means comprises a plurality of pipes laterally spaced from one another, and said feed means comprise an annular header communicating with said diffusor pipes.

7. The apparatus according to claim 3, wherein said diffusor means comprises a plurality of pipes laterally spaced from one another, and said feed means comprise an annular header communicating with said diffusor pipes, a radially extending pipe portion extending from said header, and an axially extending pipe portion extending from the inner end of the radial portion coaxial with said carrier cylinder, wherein said inlet means for the liquid comprise a tangentially arranged inlet neck, and wherein the support means for said carrier cylinder comprise a diagonally extending beam fixed to said header, a hollow shaft member extending from said beam and surrounding said axial pipe portion; with the addition of drive mechanism supported on said outer cylindrical shell for rotating said carrier cylinder, and comprising a driven sleeve surrounding said hollow shaft member with vertical thrust-bearing means therefor engaging said sleeve, as well as torque means for transmitting turning movement from said sleeve through said hollow shaft to said carrier cylinder.

8. The apparatus according to claim 7, wherein removable plugs are provided on the top side of said header, and said diffusor pipes are removable from said carrier cylinder through said header after removal of said plugs.

9. Apparatus for effecting dispersion of a treatment solution into a liquid which comprises an outer cylindrical shell, an inner cylindrical shell concentric therewith and forming with said outer shell a treatment chamber, an annular bottom interconnecting internally the adjacent ends of said cylindrical shells a carrier cylinder located in said treatment chamber concentric therewith and spaced from said bottom to provide a bottom transfer passage for the flow path of said liquid passing down at one side and up at the opposite side of said carrier cylinder, outlet conduit means for discharging liquid from one end of said flow path of the liquid through said treatment chamber, a plurality of pipes provided on said carrier cylinder, said pipes being adapted for introducing the treatment solution therethrough into said liquid being treated in said chamber, support means for said carrier cylinder enabling the same to be rotated, feed means for supplying treatment solutions to said pipes while said carrier cylinder rotates, and inlet means for supplying said liquid into the treatment chamber at the other end of said flow path.

10. Apparatus for effecting dispersion of a treatment solution into a liquid, which comprises a vertical outer cylindrical shell, an inner cylindrical shell concentric therewith, an annular bottom interconnecting the bottom end portions of said cylindrical shells and defining therewith an annular treatment chamber, a plurality of substantially vertical diffusor pipes in said treatment chamber spaced from one another about the axis of said shells, structure interconnecting said pipes for maintaining them in said spaced relationship as a unit, mounting means for supporting said unit in said treatment chamber, means for supplying treatment solution to said diffusor tubes, means for feeding the liquid to be treated tangentially into said chamber, and overflow means functionally remote from said feeding means and associated with the upper end of one of said cylindrical shells for discharging the treated liquid, whereby said liquid follows a spiral path while progressing through said treatment chamber substantially traversing said pipes.

References Cited by the Examiner

UNITED STATES PATENTS

| | | | |
|---|---|---|---|
| 1,166,319 | 12/1915 | Blichfeldt | 259—9 |
| 1,558,669 | 10/1925 | Cruz | 127—14 |
| 1,656,782 | 1/1928 | Efstathiou | 259—4 |
| 2,036,818 | 4/1936 | Meredith et al. | 127—14 |
| 2,548,332 | 4/1951 | Alexander et al. | 259—7 |
| 2,705,620 | 4/1955 | Borck | 259—3 |
| 2,890,027 | 6/1959 | Fischer | 259—16 |
| 2,915,300 | 12/1959 | Fischer | 259—16 |

FOREIGN PATENTS 1,204,284    8/1959    France.

OTHER REFERENCES

B 26,398, December 1955, Burger (German printed application).

WALTER A. SCHEEL, *Primary Examiner.*

MORRIS O. WOLK, *Examiner.*

M. E. ROGERS, J. M. BELL, *Assistant Examiners.*